Oct. 7, 1930.  W POTTS  1,777,652
MEANS FOR PROPELLING AIR AND WATER CRAFT
Filed July 31, 1928    2 Sheets-Sheet 1
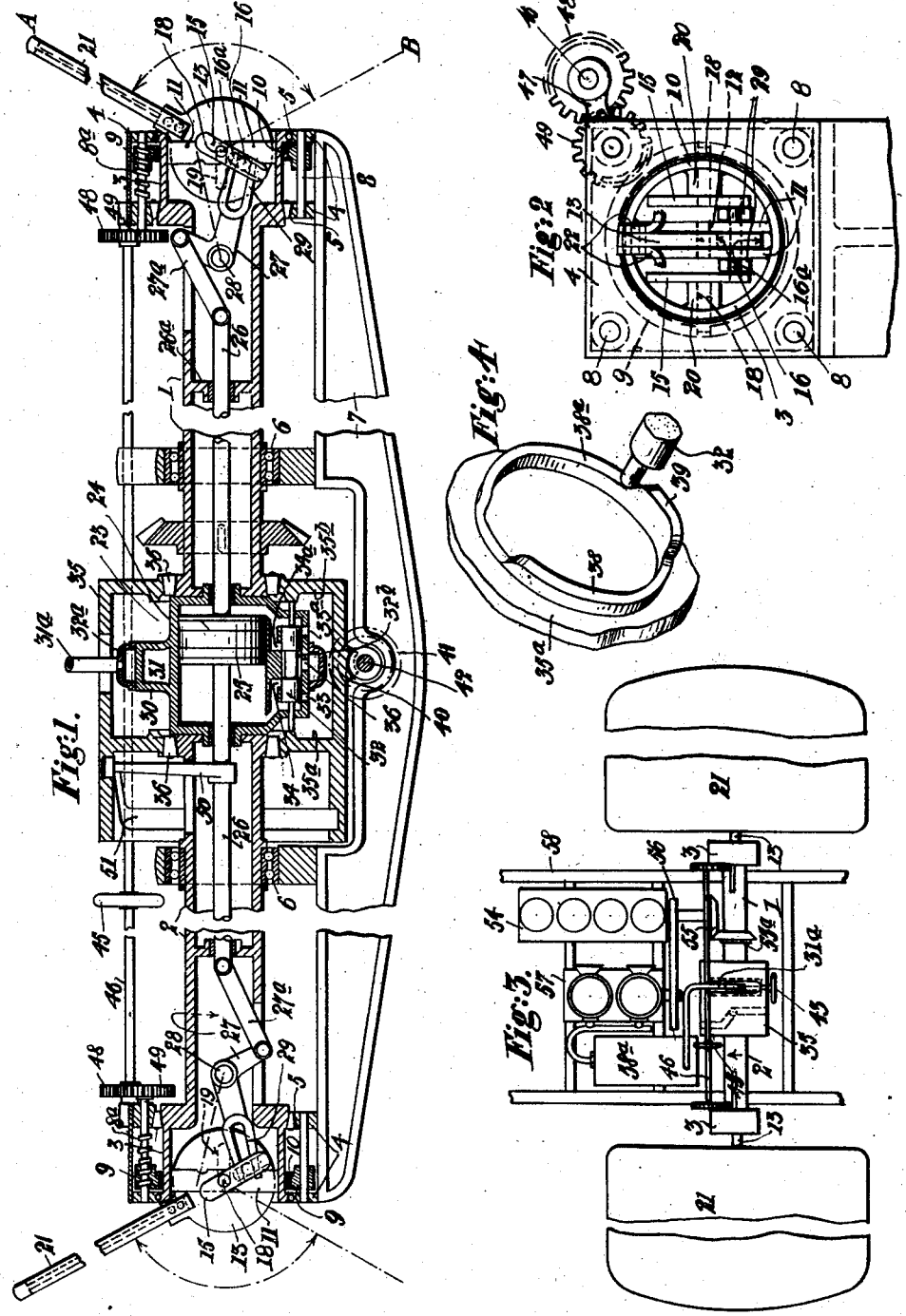
Inventor
William Potts.
by R. Haddan
his Attorney.

Oct. 7, 1930.   W. POTTS   1,777,652
MEANS FOR PROPELLING AIR AND WATER CRAFT
Filed July 31, 1928    2 Sheets-Sheet 2
Fig: 5.
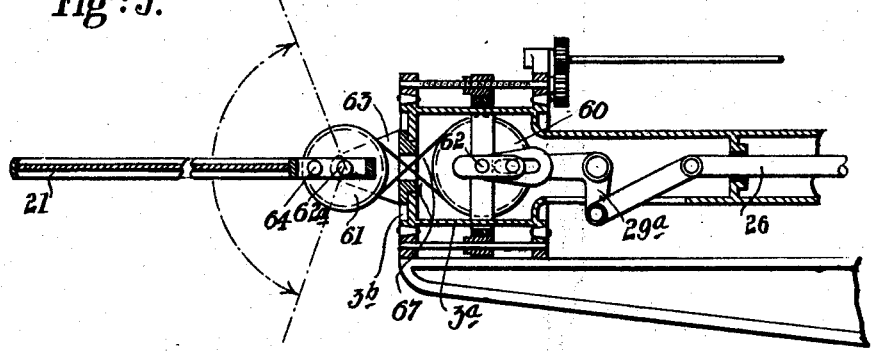
Fig: 6.
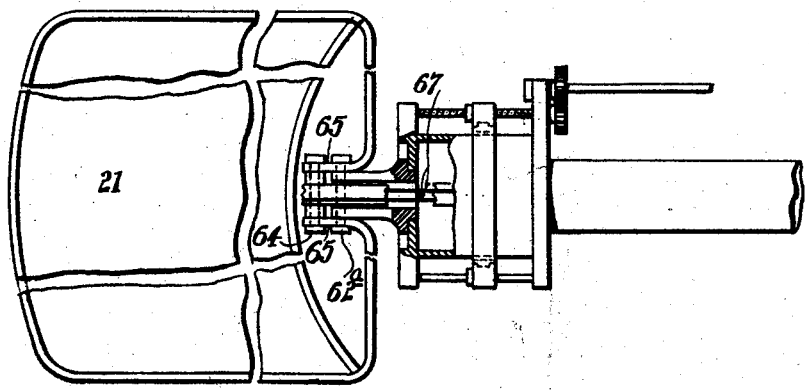
Inventor
William Potts.
by his Attorney Patented Oct. 7, 1930

1,777,652

UNITED STATES PATENT OFFICE

WILLIAM POTTS, OF NEWCASTLE-ON-TYNE, ENGLAND

MEANS FOR PROPELLING AIR AND WATER CRAFT

Application filed July 31, 1928. Serial No. 296,580, and in Great Britain May 22, 1928.

The invention relates to improvements in means for propelling air and water craft of the kind wherein pivoted wings form the propelling medium, and it has for its object to provide an improved device of this kind primarily designed for use with air craft, and wherein the wings may be used for propelling, for vertical ascent and descent, hovering or to act as a brake, with a smooth balanced action free from vibration due to sudden reversals of movement.

According to the invention the wings have a power impulse in one direction followed by a return movement in a plane substantially transverse to that of the power impulse, so that the wings feather on the return stroke with the edges leading, and wherein the change of movement at the end of the stroke is a gradual one so that a smooth action is ensured, means being also provided whereby the amplitude and also the direction of the power stroke may be varied.

The device comprises essentially a driving shaft carrying at each end a pivoted wing projecting beyond the end of the shaft and arranged to turn with the latter, and means whereby each wing is rocked about its pivot substantially transverse to the shaft axis to perform its power stroke during a portion of the rotation of the shaft, the wings during continued rotation returning edge on for the commencement of a fresh impulse. The means for tilting the wings to effect the power stroke are so designed as to effect this movement rapidly during a comparatively small part of the rotation of the shaft, so that the power stroke is completed prior to the wing passing the desired direction of movement.

The invention will now be described with reference to the accompanying drawings, in which Fig. 1 is a longitudinal section of the wing shaft.

Fig. 2 is an end view of Fig. 1 to a larger scale.

Fig. 3 is a plan showing the general arrangement.

Fig. 4 is a perspective view of a detail.

Fig. 5 shows in longitudinal section one end of the wing shaft with a modified drive for the wings, and Fig. 6 is a plan view of Fig. 5, partly in section.

Referring to the construction shown in Figs. 1 to 4 of the drawings, the shaft carrying the wings comprises two tubular shaft members 1, 2 interconnected at their inner ends and presenting at their outer ends drums 3. The members 1, 2 are supported for rotation at their outer ends in enveloping frames 4 with the air of bearings 5, and are further supported by intermediate bearings 6, said frames 4 being rigidly connected to a cross frame member 7 of the frame 58 of the craft. The wing shaft being similar at both ends reference will now be made to one end only. The frame 4 carries guide rods 8 which support for sliding movement parallel with the shaft axis a frame 9 having a stepped bore in which is free to revolve a ring 10 arranged concentrically around the axis of the shaft and enveloping the drum 3. The drum 3 is bridged by a pair of lugs 11 carrying a spindle 12 on which is mounted for rocking movement a disc 13 disposed between said lugs 11. 15, 15 designates a pair of levers disposed one on each side of the disc 13 and rigidly connected by a crank pin 16 which passes through a radial slot 16ª in the disc 13. Each of the levers 15 carries an outwardly projecting fulcrum pin 18 which extend through slots 19 in the drum 3 and which are journaled in a pair of bosses 20 formed on the inside of the ring 10. The levers 15, pin 16 and pins 18 thus form a single throw crank. 21 designates the wing, the frame 22 of which is fixed to the disc 13.

The wings are rocked by a compressed air engine 23 to the cylinder 24 of which are rigidly connected the inner ends of the tubular shaft members 1, 2. The piston 25 of the engine is double acting, each stroke causing the wings to perform their power impulse, and said piston has a pair of co-axial piston rods 26, 26 guided as indicated at 26ª for rectilinear movement in the members 1, 2, and each of said rods is connected by a link 27ª to one arm of a bell crank 27 pivoted at 28 to the corresponding shaft member, while the other end of said bell crank is forked so as to present a pair of slotted arms 29 which engage the crank pin 16 on opposite sides of the disc 13. The cylinder 24 embodies an annular casing 30 forming an annular chamber 31 and surrounded by a stationary ring $32^a$ which makes an air-tight joint with the periphery of the casing 30 and forms an annular duct to which compressed air is supplied by a pipe $31^a$. The distribution is effected by a piston valve 32 operated by a pair of cam plates $35^a$, $35^b$. Said cam plates have each on their inner faces stepped projections arranged annularly and forming cams co-operating with end extensions on opposite sides of the piston valve 32. The valve works in a chest having a pair of exhaust ports 33, $33^a$ and a pair of admission ports 34, $34^a$, the latter being adapted to communicate with an inlet port 36 establishing communication between the interior of member $32^a$ and a chamber $32^b$ formed by a reduced central portion of the valve 32. The plates $35^a$, $35^b$ form the sides of a normally stationary casing 35 which surrounds the cylinder 24 and is revolubly supported by bearings 36 on the shaft members 1, 2. As shown in Fig. 4, each cam plate comprises a pair of cam steps 38, $38^a$ of equal height and a peak step 39, such steps during the rotation of the cylinder with the shaft acting successively on the corresponding ends of the valve. The two cam plates are identical but off-set to the extent of 180°. The operation is as follows:—Regarding Figs. 1 and 4, with the piston 25 in the position shown, the left hand valve end engages the intermediate step $38^a$ of the corresponding cam plate, and both the inlet and exhaust ports are closed by the valve, this position of the valve being shown in Fig. 4. As the cylinder continues to rotate around its axis this end of the valve rides up onto the step 39, so that the valve is moved to the right, thus passing compressed air from the chamber $32^b$ through port $34^a$ so that the piston 25 is driven to the left, while the exhaust takes place on the other side of the piston through port 33. This movement of the piston will cause both wings to perform their power stroke. The end of the piston valve will then slide down onto the opposite step 38 so that the valve will be moved back to its original position, i. e. closing the admission and exhaust ports, in which position it will remain until the shaft has made approximately one half a revolution, i. e. until the wings arrive in their original position again, the wings as will be understood being carried around the edge on with the shaft. The valve will then be moved further to the left by the peak step 39 of the cam plate $35^b$ acting on the right hand end of the valve, so that port 34 will be opened and the piston 25 will be driven to the right, thereby causing the wings to flap again, in which position the piston remains until the completion of the revolution of the wing shaft. The cycle is then repeated.

Regarding the right hand end of the shaft, it will be seen that as the piston moves to the left the wing is rocked about the fulcrum 12 from the position "A" to position "B", transversely to the axis of the wing shaft, the piston rod acting through the link $27^a$ causing the bell crank 27 to rock anti-clockwise whereby the levers 15, 15 are moved by the forked end of the bell crank clockwise, this movement of the levers being transmitted to the disc 13 and thus to the wing through pin 16. The wing 21 at the other end of the shaft is operated simultaneously, and the corresponding bell crank will rock clockwise. Thus, as the wing shaft rotates the wings turning therewith are caused by the piston to perform a power stroke acting transversely to the shaft axis, this power stroke being rapidly executed, so that it is completed during a fraction of the revolution of the shaft. As the shaft continues to rotate the wing is carried around feathering from position "B" until it arrives at its original position "A" again, i. e. after half a revolution of the shaft, whereupon the operation is repeated, the piston moving in the opposite direction and the wing moving again from "A" to "B", but with its opposite face acting. Thus for each revolution of the shaft there are two power impulses of the wings, and such power impulses taking place at every half revolution of the shaft and during a portion of such half revolution.

The cam plates $35^a$, $35^b$ are adjustable around the axis of the wing shaft, so that the power stroke of the wings may be timed to occur at different angles, such adjustment being effected by the provision on the casing 35 of a worm segment 40 with which engages a worm 41 on a shaft 42 supported by the frame 7 and turned by a hand wheel 43 (Fig. 3). Thus by turning the worm the position of the cam plates may be adjusted relatively to the valve, so that the wings may be caused to beat in a substantially vertical plane for rapid ascent or hovering, or in a horizontal direction contrary to the direction of travel of the craft to use the wings as a brake, in addition to the normal beat for propulsion of the craft.

The amplitude of movement of the wings is adjustable by means of a hand wheel 45 fixed to a shaft 46 supported for rotation by brackets 47 on the members 4, said shaft carrying at opposite ends a gear 48. One of the pins 8 of each member 4 is revolubly supported by the member 4 and is provided with a screw thread as shown at $8^a$, said screw thread engaging with an internally screwed bore in the member 9. The screw threaded pins carry at one end a fixed gear 49 meshing with the gear 48. Thus by turning the hand wheel 45 the member 9 and thereby the ring 10 with pins 18 may be moved lengthwise of the wing shaft towards or away from the fulcrum of the bell crank 27, the pins 18 sliding in the slots 19 in the drum 3, and the pin 16 sliding in the forked ends of the bell cranks, so that the amplitude of movement of both wings may be varied as desired.

In order to ensure the piston completing its strokes, and to hold the piston and thus the wings in position at the ends of their strokes, one of the piston rods may have fixed thereto an arm 50 extending through a slot in the member 2, so that the arm turns with the shaft but is free to move with the piston rod. The arm carries at its outer end a roller engaging a cam slot 51 formed in the casing 35, said slot being so formed that the travel of the arm is equal to the full stroke of the piston.

The wing shaft is shown in Fig. 3 as driven by an internal combustion engine 54 through bevel gearing 55, 55$^a$, said engine also driving by chain gear 56 an air compressor 57 delivering to a reservoir 58$^a$ which communicates with the member 32$^a$ by means of pipe 31$^a$.

Referring to Figs. 5 and 6, showing an alternative drive for the wings, in this case the movement of the piston 25 is transmitted to the wings by a pair of pulleys 60, 61 at each end of the wing shaft, said pulley 60 being analogous to the disc 13, and the drive being transmitted to the pulley 60 from the piston rods 26 by gear identical to that above described with reference to Figs. 1 and 2. 29$^a$ designates a bell crank corresponding to the bell crank 29 and actuating the pulley 60. The pulley 61 is revoluble on a pin 62$^a$ carried by a forked bearing arm 63 on a plate 3$^b$ fixed to the drum 3$^a$ and said pulley is provided with a crank pin 64. The frame of the wing comprises at its inner end a pair of inwardly bent arms 65, 65 engaged by the pins 62$^a$, 64, the pin 62$^a$ forming the fulcrum about which the wing rocks. The pulley 60 drives pulley 61 by a pair of wire ropes 67 crossed where they pass through an aperture in the plate 3$^b$, and said ropes are preferably fixed at their ends to the respective pulleys. As shown, the pulley 61 is smaller than the other pulley 60 so that the drive is geared up.

While the means above described are well adapted to operate the wings in the desired manner, it will be understood that considerable modification of the mechanism may be made without departing from the spirit of the invention, which is essentially the movement of the wings in the particular manner described.

I claim:—

1. Means for propelling air and water craft comprising a unidirectionally driven shaft, pivoting means mounted on said shaft about a diametral axis which intersects the axis of said shaft, wings mounted on the outer ends of said pivoting means so that in the mid position of said pivoting means the centre lines of said wings are in alinement with the axis of said shaft, and means for rocking said wings on their pivots unidirectionally to produce a power stroke transversely during a part of each revolution of the shaft, the wings after each power stroke rotating with the shaft in feathering position to their initial position for commencement of a fresh power stroke.

2. Means for propelling air and water craft comprising a unidirectionally driven shaft, transverse pivoting means fixed to said shaft, wings mounted on said pivoting means so as to rotate with said shaft substantially radially in feathering position and means for rocking said wings on their pivots unidirectionally to produce a power stroke transversely to such feathering position during a part of each half revolution of the shaft so that the wings beat with opposite faces alternately, the wings after each power stroke rotating with the shaft in feathering position to their initial position for commencement of a fresh power stroke.

3. Means for propelling air and water craft comprising a unidirectionally driven shaft, pivoting means mounted on said shaft about a diametral axis which intersects the axis of said shaft, wings mounted on the outer ends of said pivoting means so that in the mid position of said pivoting means the centre lines of said wings are in alinement with the axis of said shaft and means carried by said shaft for rotation therewith and operatively connected with said wings for rocking the latter on their pivots unidirectionally to produce a power stroke during a part of each revolution of the shaft, the wings after each power stroke rotating with the shaft in feathering position to their initial position for commencement of a fresh power stroke.

4. Means for propelling air and water craft comprising a unidirectionally driven shaft, pivoting means mounted on said shaft about a diametral axis which intersects the axis of said shaft, wings mounted on the outer ends of said pivoting means so that in the mid position of said pivoting means the centre lines of said wings are in alinement with the axis of said shaft and means carried by said shaft for rotation therewith and operatively connected with said wings for rocking the latter on their pivots unidirectionally to produce a power stroke during a part of each revolution of the shaft, and means operatively connected with said wing rocking means for timing the operation of the latter.

5. Means for propelling air and water craft comprising a shaft, means for rotating said shaft, transverse pivoting means on said shaft, wings mounted on said pivoting means and means carried by said shaft for rotation therewith and operatively connected with said wings for rocking the latter on said pivoting means in one direction during a part of each revolution of the shaft, and means whereby the amplitude of movement of said shaft rocking means may be varied.

6. Means for propelling air and water craft comprising a tubular shaft, means for rotating said shaft, transverse pivoting means on said tubular shaft, wings mounted on said pivoting means, a reciprocating second shaft coaxial with and mounted inside the first shaft for rotation therewith and operatively connected to said wings to rock same on said pivoting means in one direction during a part of each revolution of the shaft, and means carried by said tubular shaft for driving said reciprocating shaft, the wings after each power stroke returning in tilted position to their initial position for commencement of a fresh power stroke.

7. Means for propelling air and water craft comprising a shaft, means for rotating said shaft, transverse pivoting means on opposite sides of said shaft, wings mounted on said pivoting means, a power cylinder connected to said shaft for rotation therewith, and a piston in said cylinder operatively connected to said wings to rock the latter on their pivoting means in one direction during a part of each revolution of the shaft, the wings after each power stroke returning in tilted position to their initial position for commencement of a fresh power stroke.

8. Means for propelling air and water craft comprising a shaft, means for rotating said shaft, transverse pivoting means on opposite sides of said shaft, wings mounted on said pivoting means, a power cylinder connected to said shaft for rotation therewith, a piston in said cylinder operatively connected to said wings to rock the latter on said pivoting means in one direction during a part of each revolution of the shaft, a frame supporting said wing shaft, a valve connected to said cylinder and controlling the distribution thereof, and camming means carried by said frame and adapted to operate said valve during rotation of the cylinder, the wings after each power stroke returning in tilted position to their initial position for commencement of a fresh power stroke.

9. Means for propelling air and water craft comprising a shaft, means for rotating said shaft, transverse pivoting means on opposite ends of said shaft, wings mounted on said pivoting means, a power cylinder connected to said shaft for rotation therewith, a piston in said cylinder operatively connected to said wings to rock the latter on said pivoting means in one direction during a part of each revolution of the shaft, a frame supporting said wing shaft, a valve connected to said cylinder and controlling the distribution thereof, adjustable camming means carried by said frame and adapted to operate said valve during rotation of the cylinder, and means for adjusting said camming means so that the actuation of the valve, and thereby the rocking of the wings, may be timed, the wings after each power stroke returning in tilted position to their initial position for commencement of a fresh power stroke.

10. Means for propelling air and water craft comprising a shaft, means for rotating said shaft, transverse pivoting means on opposite ends of said shaft, wings mounted on said pivoting means, a power cylinder connected to said shaft for rotation therewith, a double acting piston in said cylinder operatively connected to said wings to rock the latter in one direction during a part of each revolution of the shaft, a frame supporting said wing shaft, a valve connected to said cylinder and controlling the distribution to both sides of said cylinder alternately, adjustable camming means carried by said frame and adapted to operate said valve during rotation of the cylinder, means for adjusting said camming means so that the actuation of the valve and thereby the rocking of the wings may be timed, said wings after each power stroke returning in tilted position to their initial position for commencement of a fresh power stroke.

11. Means for propelling air and water craft comprising a shaft, means for rotating said shaft, transverse pivoting means on the ends of said shaft, a wing mounted on each of said pivoting means, a power cylinder fixed to said shaft for rotation therewith, a double acting piston in said cylinder operatively connected on each side to one of said wings to rock the latter simultaneously on said pivoting means in one direction during a part of each revolution of the shaft, a frame revolubly supporting said wing shaft, a piston valve controlling said cylinder and adapted to move in opposite directions to control the distribution to both sides of said cylinder alternately, a drum casing carried by said frame and revolubly mounted for rotation around said shaft, cams formed on each side of said casing and adapted to operate on opposite sides of the piston valve to move same in opposite directions, and means for adjusting the drum around the shaft, so that the timing of the valve may be effected, and said wings after each power stroke returning in tilted position to their initial position for commencement of a fresh power stroke.

12. Means for propelling air and water craft comprising a rotary shaft, means for rotating said shaft, transverse pivoting means on each end of said shaft, a lever mounted on said pivoting means, means carried by said shaft for rocking said lever in one direction during a part of each revolution of the rotary shaft, a wing attached to said lever, a stationary frame supporting said rotary shaft, a sliding member carried by said frame and adjustable parallel with the rotary shaft, a ring supported by said adjustable member for rotation concentrically with said rotary shaft, a crank pivoted to the interior of said ring, a second lever carried by said shaft, and having a slotted arm engaged with the crank pin, means for adjusting the ring supporting member to move the crank pin in the slotted arm towards and away from the pivot of said second lever, and said crank engaging with its journals longitudinal slots in opposite sides of the shaft.

13. Means for propelling air and water craft comprising a shaft, means for rotating said shaft, transverse pivoting means on said shaft, wings mounted on said pivoting means and means for rocking said wings on said pivoting means in one direction during a part of each revolution of the shaft, and means for holding the wings in rocked position after each stroke on their return to initial position for commencement of a fresh power stroke.

14. Means for propelling air and water craft comprising two tubular coaxial shafts, a compressed air engine comprising a cylinder interposed coaxially between and rigidly connecting said shafts, means for rotating said shafts, transverse pivoting means on the outer ends of said shafts, a wing mounted on said pivoting means at each end of the shaft, a double acting piston in said cylinder, a piston rod on each side of said piston operatively connected to said wings to rock the latter at each piston stroke in one direction during a part of each revolution of the shafts, a frame supporting said shafts, a valve chest connected to said cylinder, a piston valve in said chest adapted to admit compressed air to both sides of said cylinder alternately, a drum casing revolubly supported for rotation around said shafts, cams on each side of said drum casing adapted to move the piston valve in opposite directions to admit compressed air to opposite sides of the cylinder alternately, and means for manually rotating said drum.

15. Means for propelling air and water craft comprising two tubular coaxial shafts, a compressed air engine comprising a cylinder interposed coaxially between and rigidly connecting said shafts, means for rotating said shafts, transverse pivoting means on the outer ends of said shafts, a wing mounted on said pivoting means at the outer ends of the shafts, a double acting piston in said cylinder, a piston rod on each side of said piston operatively connected to said wings to rock the latter at each piston stroke in one direction during a part of each revolution of the shaft, a frame supporting said shafts, a valve chest connected to said cylinder, a piston valve in said chest adapted to admit compressed air to both sides of said piston alternately, a drum casing revolubly supported for rotation around said shafts, cams on each side of said drum casing adapted to move the piston valve in opposite directions to admit compressed air to opposite sides of the piston alternately, means for manually rotating said drum, a cam groove inserted in said drum casing, an arm fixed to one of the piston rods and engaging with the cam groove, said cam groove having a rise equal to the full stroke of the piston.

16. Means for propelling air and water craft comprising two tubular coaxial shafts, a compressed air engine comprising a cylinder interposed coaxially between and rigidly connected to said shafts, transverse pivoting means on the outer ends of said shafts, a wing mounted on said pivoting means at the outer ends of the shafts, a double acting piston in said cylinder, a piston rod on each side of said piston, operatively connected to said wings, to rock the latter at each piston stroke in one direction during a part of each revolution of the shaft, a frame supporting said shafts, a valve chest connected to said cylinder, a piston valve in said chest, adapted to admit compressed air to both sides of said piston alternately, a drum casing revolubly supported for rotation around said shafts, cams on each side of said drum casing adapted to move the piston valve in opposite directions to admit compressed air to opposite sides of the piston alternately, means for manually rotating said drum casing, a cam groove formed in the periphery of said casing, an arm fixed to one of the piston rods and engaging with the cam groove, said cam groove having a lateral rise equal to the full stroke of the piston, an air compressor adapted to supply compressed air to said engine and a prime mover connected to one of said shafts and to the air compressor to drive both.

I have signed this specification.

WILLIAM POTTS.